Dec. 21, 1943.   W. B. F. HALL   2,337,463
RANGE FINDER FOR PHOTOGRAPHERS
Filed Dec. 15, 1939
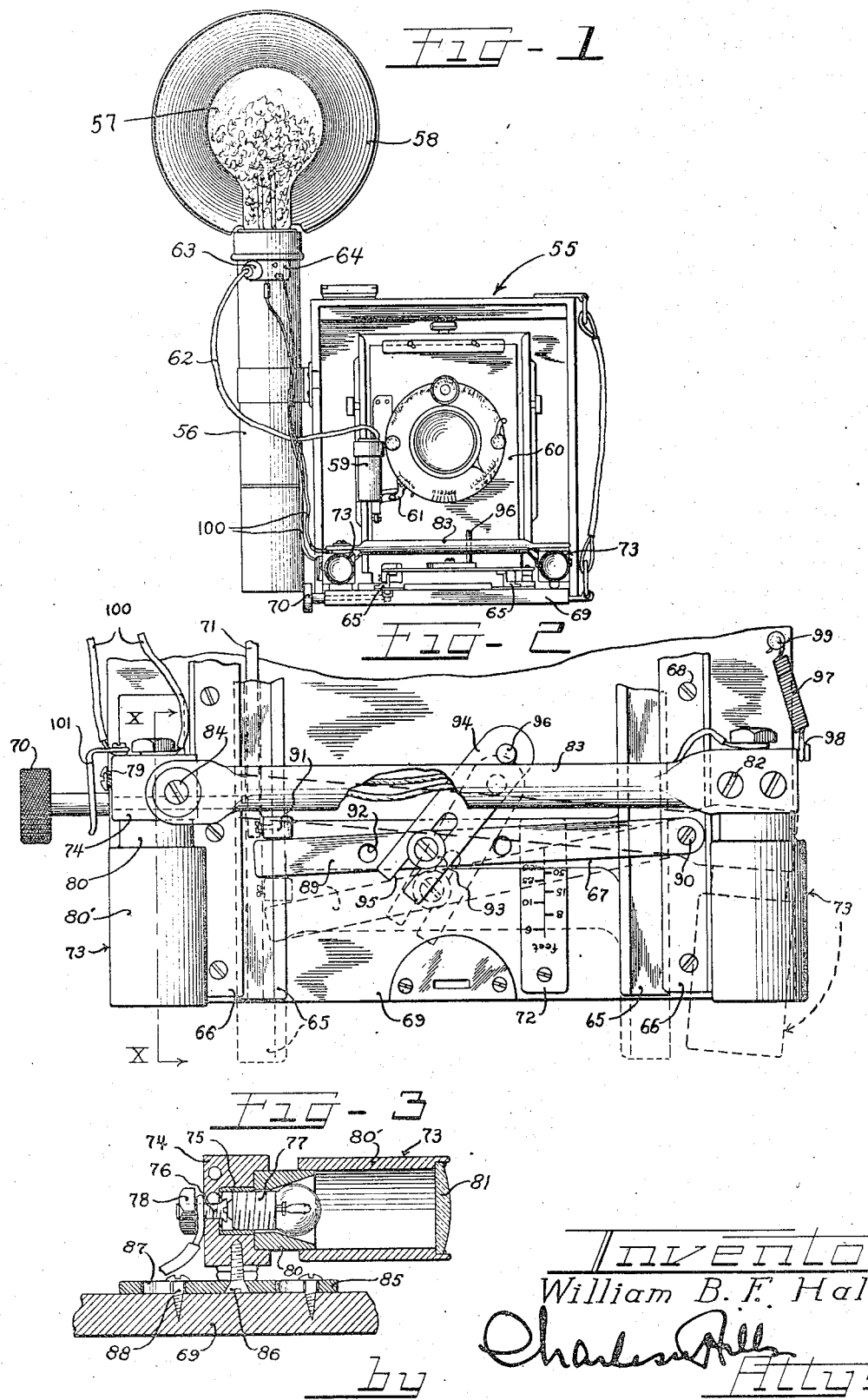
Inventor
William B. F. Hall
by Charles... Attys Patented Dec. 21, 1943

2,337,463

UNITED STATES PATENT OFFICE 2,337,463

RANGE FINDER FOR PHOTOGRAPHERS

William B. F. Hall, Fort Wayne, Ind., assignor to William F. Noll, Fort Wayne, Ind.

Application December 15, 1939, Serial No. 309,395

4 Claims. (Cl. 95—44)

The present invention relates in general to a distance measuring device and is concerned particularly with a range finder for use by photographers to enable accurately focusing of the camera on the object to be photographed, especially where pictures are to be taken indoors.

The ordinary and usual type of range finders, especially utilizing a prismatic system, are in general unsuited for indoor work, since they are dependent for their accuracy upon the distinctness of the viewed image of the object to be photographed. Due to the subdued lighting effects usually present indoors, and particularly at night under artificial lighting, it is very difficult if not impossible, to quickly and conveniently secure an accurate determination of the distance to the object to be photographed, by the use of ordinary types of range finders.

With a view to overcoming the foregoing as well as other objections to range finders as now generally utilized by photographers, it is a primary object of the herein described invention to provide an improved range finding device which may be readily and conveniently utilized for indoor work, and which will not be dependent for accurate indication upon an intense illumination of the object while securing the distance thereof.

A further object of the invention is to provide an improved range finder construction which is particularly adapted for use indoors and in other places having subdued lighting effects.

It is also an object of the herein described invention to provide an improved range finder attachment for cameras which may be cooperatively associated with the usual focusing mechanism of the camera in such a way that operation of the range finder automatically adjusts the camera focus for the correct distance.

Other objects and features of the present invention will more full appear from the following detailed description taken in connection with the accompanying drawing which illustrates several embodiments thereof, and in which:

Figure 1 is a view in elevation showing a preferred form of the invention mounted on a camera and cooperatively associated with its lens focusing mechanism;

Figure 2 is an enlarged fragmentary plan view of the same showing the various constructional details and the cooperative relationship of certain of its parts; and Figure 3 is a sectional view through one of the light beam projectors, and showing the manner of removably attaching the device to the front closure member of the camera; taken substantially on line X—X of Figure 2.

In Figure 1 I have shown the invention as incorporated in an attachment which may be applied to a camera as generally indicated at 55.

As will be noted, the photoflash gun is in this instance mounted on the side of the camera and is of the usual construction comprising a tubular battery case 56 which furnishes the necessary energizing current for flashing the usual flash bulb 57 mounted in a suitable screw socket at the top of the battery case. This bulb has a reflector 58 behind it, the reflector being removably supported in any suitable manner from the battery case. As is the usual practice, this battery case also mounts a pushbutton switch (not shown) for controlling the circuit through the flash bulb and also the synchronizing mechanism for releasing the shutter of the camera at the proper time.

In this instance, the shutter release actuator as indicated at 59 is mounted on the lens mounting board 60 on the camera in cooperative relationship with the shutter releasing trigger 61. The shutter release actuator in this instance is electrically energizable through circuit connections 62 which are arranged to be removably connected by a suitable plug 63 to a terminal block 64 mounted on the battery case and containing electrical connections to the battery.

The camera is of the usual construction, the lens mounting board being forwardly and rearwardly movable to adjust the camera focus. More specifically, the lens mounting board is supported in an upright position on a pair of spaced rail members 65—65, these rail members being movable longitudinally and guided by lateral guide rails 66—66. A transversely extending rail 67 interconnects the guide rails for unitary movement. The guide rails 66 are secured as by screws 68 to the front closure member 69 of the camera housing.

For manually moving the lens mounting board, there is provided a focusing adjusting knob 70 which is rotatably supported in the closure member and laterally projects to one side thereof. This knob is connected at its innermost end with a small pinion which meshes with a rack 71 on the adjacent rail 65. Thus by rotating the focusing adjusting knob, the rails 65—65 may be moved forwardly and rearwardly in their associated guide rails, and since the lens mounting board is carried by these rails, the lens will likewise be moved forwardly and rearwardly to bring a distant object into proper focus.

The connecting rail 67 has one of its edges associated with a suitable scale member 72 having object distance indicating indicia thereon. Thus, if an object is, for example, at a distance of eight feet from the camera, the focusing adjusting knob will be actuated to bring the forward edge of the rail 67 to the eight foot indicating mark on the scale 72. At this setting, the lens should be properly adjusted to be in focus for this object distance.

As in the previously described forms of the invention, the present form includes a pair of spaced light beam projectors 73—73, each being constructed as shown in Figure 10. As there shown, the light projector comprises a mounting block 74 which is fitted with a lamp receiving socket 75 which is secured in position in any suitable manner. Extending into the bottom of the socket is a screw 76, the head of this screw being insulated relative to the socket and forming one connection to a lamp 77. The screw 76 has its shank portion projecting from the mounting block and is provided with a suitable nut 78 so that a circuit connection wire may be connected to the screw. The other connection to the lamp is formed by the socket 75, this socket being electrically connected to a screw 79 at one side of the mounting block.

Extending from the open end of the socket is a tubular extension 80 having its bore axially aligned with the socket. This extension is arranged to receive over its outer end one end of the barrel 80'. At the outer end of this barrel is a lens 81 for condensing or concentrating the light rays emitted by the lamp. This lens enables the use of low power lamps.

One of the light beam projectors, as shown in Figure 2, is mounted at the left forward end of the closure member 69, and the other light beam projector is disposed at the right forward end of the closure member. This latter light beam projector is supported as by screws 82 at the outermost end of a rod 83, this rod having its other end pivoted as shown at 84 on the mounting block of the other light beam projector. Thus, the light beam projectors may be relatively pivoted to bring their projected beams into converging relation.

The light beam projector at the left, as shown in Figure 2, is preferably stationary and does not pivot as in the case of the other light beam projector. The stationary projector, however, is removably mounted on the closure member 69 by securing the mounting block 74 to a small plate 85 as by a suitable screw 86. The plate 85 is provided with spaced keyhole openings 87 for respectively receiving screws 88 on the closure member 69. The light beam projectors may therefore be attached to the closure member 69 simply by inserting the heads of the screws 88 through the large portions of the keyhole openings, and then by longitudinally shifting the plate 85, the screws will hold the plate 85 against the closure member 69.

Movement of the rod 83 in response to focusing movement of the lens mounting board is accomplished by providing an arm 89 that is pivoted for swinging movement at one end as shown at 90. The other end of this arm is arranged to bear against an adjustable abutment 91 secured on the left-hand rail 65.

The arm 89 intermediate its ends is provided with a plurality of threaded openings 92 for selectively receiving a screw 93 by means of which an extension 94 may be secured in various positions to the arm. The extension is provided with an end slot 95 for receiving the screw 93, this slot enabling longitudinal adjustments of the extension. The outer end of this extension is provided with an upstanding pin 96 having bearing engagement with the rod 83. A spring 97 having one end connected as at 98 to the right-hand light beam projector and its other end connected as at 99 to the closure member 69 is utilized to bias the rod 83 for movement in a counterclockwise direction and maintain the rod in bearing engagement against the pin 96.

The lamps of the light beam projectors are connected through circuit wires 100 to the terminal block 64, a control switch being interposed in the lamp circuit.

This switch comprises a contact member 101 of flexible conducting material which is secured at one end to the left-hand mounting block 74 and has its free end extending over the screw 79. The contact 101 is connected to one of the circuit wires 100 and is disposed adjacent the focusing adjusting knob so that the operator without removing his hand from the adjusting knob may deflect the contact 101 into engagement with the screw 79 and thus close the circuit to the lamps 77 of the light beam projectors.

It will be appreciated that the movement of the arm 83 carrying the right-hand light beam projector must be properly adjusted or synchronized with the movements of the lens mounting board in order that the lens will at all times be properly focused on the point of convergence of the light beam from the projectors. This adjustment is accomplished as follows:

With the camera focused for infinity, that is, with the forward edge of the connecting rail 67 at 100 on the scale 72 as shown in full lines in Figure 2, the position of the pin 96 is adjusted forwardly or rearwardly until the beams of light from the light projectors are in parallel relation. This may be determined by projecting the beams onto a wall surface and noting whether the beam spots are the same distance apart as the projectors.

The camera is then set for a known object distance such as six feet and the beams projected onto a wall surface at that distance. If the beam spots are superimposed, the adjustment is correct and the movements of the arm 83 and the lens mounting board are in synchronization.

If the light beams converge at a lesser distance than the six foot distance, the pin 96 is shifted transversely to the left as viewed from the rear of the camera, and if the lights converge at a distance greater than the six feet the pin is moved transversely to the right or in the opposite direction. By a few trial adjustments, the correct setting of the pin 96 may be determined to produce the parallel beams at infinity and converge the beams at the six foot distance or other known distance to provide the proper synchronization of the range finding mechanism with the focusing mechanism.

It will be appreciated that once the proper synchronization is obtained, it is not necessary to refer to the scale 72 in order to focus the camera on the object to be photographed. It is only necessary to perform the usual focusing operation and bring the projected light beams into converged relation so that their beam spots are superimposed on the object to be photographed. The camera is then in proper focus. This arrangement provides a novel method of focusing a camera, and it is thought that this method will be fully apparent to those skilled in the art. The herein described device and method of focusing has the further advantage, as will be apparent, that it serves to properly position the camera with reference to the object, the superposed light beam spots indicating to the operator the center of the view that is to be photographed.

While in the present instance I have chosen to disclose for purposes of illustration a range finder in which the angularly adjustable light beams are arranged so that their beam spots may be brought into superposed relation on a surface of the object to be photographed, it will be apparent that the invention may be practiced by bringing the beam spots into other predetermined relationships or patterns. For example, the spots may be arranged for movement on parallel courses to indicate the proper focus when these spots are axially aligned or again the spots may indicate the proper focus when their edges are brought into engagement.

The word "camera" as utilized herein is intended to include not only apparatus for the taking of pictures or photographs but also such devices as stereopticons, moving picture projectors, enlargers and the like, in fact, any device utilizing a lens arranged to be focused on a remote screen or object.

From the foregoing description, it will be apparent that the present invention provides an improved range finding device which may be readily and conveniently utilized for indoor work; which will not be dependent for accurate indication upon an intense illumination of the object to be photographed; which may be incorporated in a light portable folding construction that may be folded into a compact arrangement when not in use, and extended into an expanded assembly when it is desired to use the same; which is of such construction and operation that it may be incorporated as a part of other devices for use in the taking of photographs, such as a photoflash gun, which in its preferred form may be cooperatively associated with the focusing mechanism of a camera in such a way that the operation of the device automatically adjusts the camera focus for the correct distance, and which embodies an improved method of focusing a camera.

It is, of course, to be understood that although I have described in detail an embodiment of the invention, the invention is not to be thus limited, but only insofar as defined by the scope and spirit of the appended claims.

I claim as my invention:

1. A focusing device for a camera having a lens and a mounting therefor adjustably carried on a support for movement relative thereto, comprising a pair of spaced light projecting elements each including a light source, one of said elements being mounted on said camera, an arm pivotally carried by said one element for supporting the other element for relative movement, an additional arm pivotally mounted at one end to said camera support, an adjustable abutment member on the lens mounting for engagement with the other end of said additional arm, and another arm adjustably connecting said first and second mentioned arms for turning said other element relative to said one element as the lens mounting is moved relative to said camera support.

2. A focusing device for a camera having a lens and a mounting therefor adjustably carried on a support for movement relative thereto, comprising a scale on said camera support for indicating the lens position in terms of distance from an object on which the lens is to be focused, a pair of spaced light projecting elements each having a light source, one of said elements being mounted on said camera, an arm pivotally mounted on said one element for supporting the other element for relative movement, an additional arm pivotally mounted at one end to said camera support, an adjustable abutment member on the lens mounting for engagement with the other end of said additional arm, and another arm adjustably connecting said first and second mentioned arms for turning said other element relative to said one element as the lens mounting is moved relative to said camera support whereby, when the light beams projected by said elements are brought into predetermined relation, said distance is indicated on said scale.

3. In combination, a camera including a lens and an adjustable support mechanically connected to said lens for providing a focusing adjustment with respect to an object, a pair of light beam projecting elements mounted in spaced relation an the camera, adjustable supporting means on said camera connected to said elements for providing relative movement of said elements in their own plane, and a mechanical linkage means between said adjustable support and said adjustable means for maintaining said elements in such relation to one another that light beams emitted therefrom coincide at the point in space for which said lens is focused.

4. In combination, a camera including a lens and an adjustable support mechanically connected to said lens for providing a focusing adjustment with respect to an object, a pair of light beam projecting elements mounted in spaced relation on the camera, adjustable supporting means on said camera connected to said elements for providing relative movement of said elements in their own plane, and a mechanical linkage means between said adjustable support and said adjustable means for maintaining said elements in such relation to one another that light beams emitted therefrom coincide in the plane of the point in space for which said lens is focused.

WILLIAM B. F. HALL.